Feb. 2, 1943.   P. KLOTSCH   2,309,734
BRAKE CONTROL MECHANISM
Filed Feb. 19, 1941
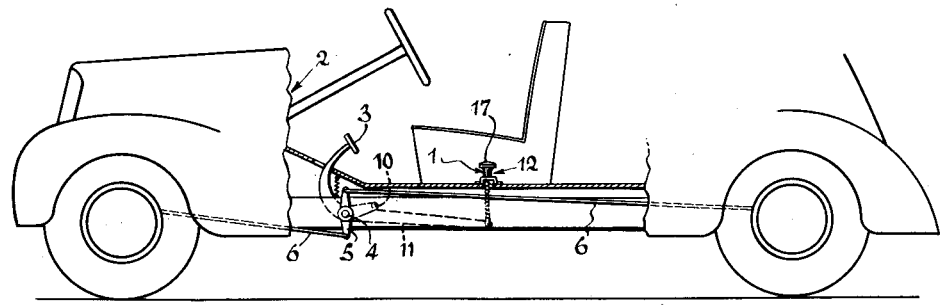
Fig. 1
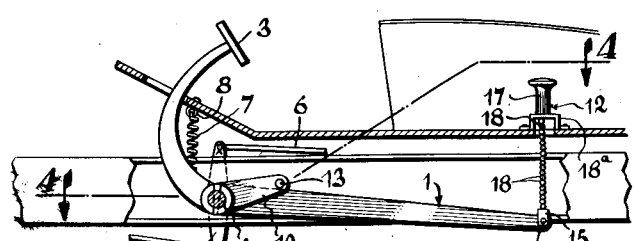
Fig. 2
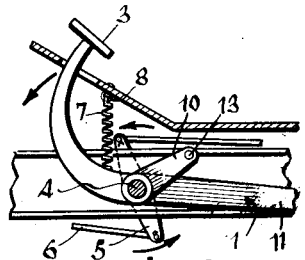
Fig. 5
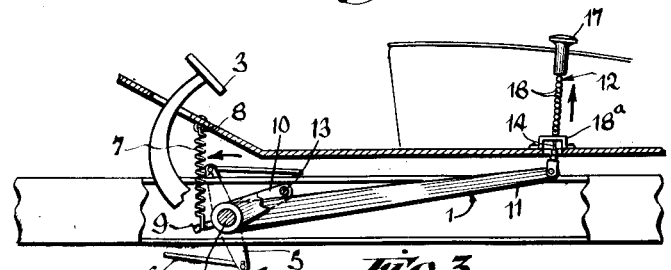
Fig. 3
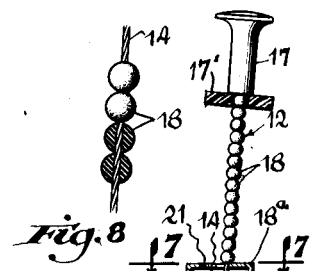
Fig. 8
Fig. 6
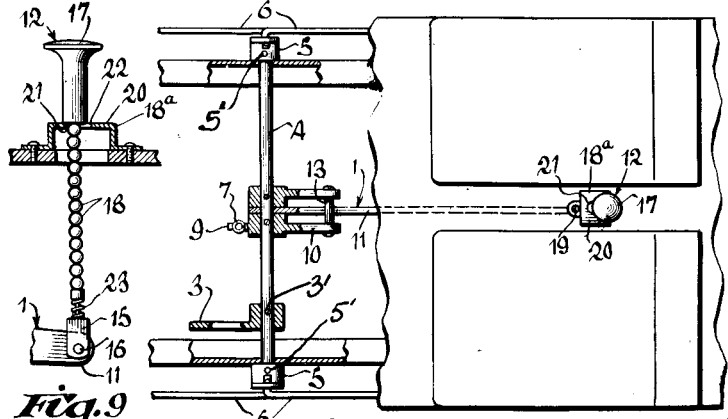
Fig. 9   Fig. 4   Fig. 7
INVENTOR.
PAUL KLOTSCH
ATTORNEY.

Patented Feb. 2, 1943

2,309,734

UNITED STATES PATENT OFFICE 2,309,734

BRAKE CONTROL MECHANISM

Paul Klotsch, Cincinnati, Ohio, assignor to The Crosley Corporation, Cincinnati, Ohio, a corporation of Ohio Application February 19, 1941, Serial No. 379,661

4 Claims. (Cl. 74—502)

This invention relates to braking apparatus, and is particularly directed to improvements in hand brakes and the control mechanism thereof, principally as employed in automotive vehicles.

The hand brake, sometimes called the emergency or parking brake, may control either an independent braking system, or as more commonly practiced, may be interconnected with the service or foot operated brakes to maintain the braking pressure and hold the vehicle stationary after it has been brought to a standstill as in parking.

The hand brake usually consists of a hand lever installed in the driver's compartment and equipped with releasable ratchet locking means to maintain the braking pressure when the lever is set. However, the pawl and ratchet arrangement is subject to considerable wear, is relatively expensive to manufacture and install, and moreover provides only a limited number of holding points, sometimes making it difficult to lock the lever at the proper holding position.

Moreover, it has been experienced that the arrangement is not entirely dependable in that the braking pressure, as initially applied, tends to diminish due to cooling and contraction of the brake drums, and to other factors, thus creating a hazard, especially should the vehicle be parked on a grade. In some instances complete release of the brakes occurs because of worn parts or improper engagement of the holding means.

The present apparatus is designed to overcome these disadvantages by the provision of yieldable locking means for the brake, whereby slight changes in tension due to temperature and other factors are compensated for, the resilient or yieldable holding means taking up the slack that would ordinarily be transmitted to and effect the brake pressure. The lock is direct acting and positive in operation, and provides an increased range of adjustment over that permissible with a pawl and ratchet or similar locking device.

As it is desirable to conserve as much space as possible in the driver's compartment for the comfort and convenience of the driver and passengers, the hand lever as ordinarily installed constitutes an undesirable obstruction. The improved apparatus is controlled by means of a vertical pull rod, located at or between the seats in the driver's compartment, offering no obstruction and providing for more convenient manipulation thereof.

It is an object of the invention to provide an improved hand brake having a direct and positive resilient locking or holding means operable to maintain a constant braking pressure regardless of changes in temperature and other factors tending to decrease the pressure initially applied.

It is another object to provide a simplified inexpensive control apparatus, which offers a greater range in the selection of a locking position, whereby the degree of braking pressure applied may be more accurately suited to requirements with sufficient latitude to compensate for small variations such as brake wear and other irregularities.

It is further object to provide a structure having the actuating lever located beneath the vehicle offering no obstruction in the driver's compartment, and operated by a vertical pull rod positioned at or between the seats for more convenient manipulation thereof.

Further objects and advantages of the invention will be more fully apparent from a description of the illustrative embodiment shown in the accompanying drawing, in which:

Figure 1 is a diagrammatic side view partially in section, showing the apparatus applied to the braking system of an automobile.

Figure 2 is an enlarged fragmentary side view of the mechanism, shown in its released position.

Figure 3 is a view similar to Figure 2, showing the apparatus locked in braking position.

Figure 4 is a section taken on line 4—4 of Figure 2.

Figure 5 is a fragmentary view similar to Figure 2, showing the actuation of the service or foot brake independent of the hand brake when the hand brake is in released position.

Figure 6 is an enlarged fragmentary view, showing the brake pull rod locked in braking position.

Figure 7 is a section taken on line 7—7, Figure 6, illustrating the locking fixture with the pull rod engaged in the keyhole slot thereof in locking position.

Figure 8 is an enlarged fragmentary view, detailing the pull rod or cable with the locking balls or beads in place thereon.

Figure 9 is a side elevation, illustrating a modified pull rod construction, showing an arrangement wherein metal balls have been substituted for those of resilient material.

Briefly, the improved actuating mechanism may be described as one comprising a lever horizontally disposed beneath the floor of the driver's compartment, pivoted at one end and interconnected preferably with the service or foot operated braking system. The opposite or free end of the lever is provided with a vertical pull rod or plunger, extending upwardly through the floor of the vehicle and conveniently located either at the forward edge of the seat, or if the seat is divided, between the two sections of the seat. The upper end of the pull rod includes a handle or knob, providing a convenient hand-hold for actuation of the lever, the brakes being applied by pulling the rod upwardly.

The pull rod is locked or held in braking position by means of a series of balls, preferably of rubber or other resilient material, slidably strung thereon for the full length of the rod in the manner of a string of beads. The pull rod extends through a catch in the form of a keyhole slot, located at or near the floor, and having an opening of sufficient size to permit free passage of the balls. The keyhole slot includes a notch to receive and embrace the rod, but capable of blocking passage of the balls when the rod or cable is swung laterally to engage the same, thereby resiliently locking the rod in braking position.

The braking pressure, after the pull rod has been actuated and has been engaged in the slot, is transmitted through the yieldable or resilient balls engaged between the knob and the top of the slotted bracket, thereby exerting a yielding or spring tension on the lever. The lever is thus put under a continuous pressure which is substantially unaffected by contraction of the parts of the brake mechanisms. The engagement is positive and proof against accidental release due to improper engagement or slippage.

Referring to Figure 1 of the drawing, illustrating one embodiment of the invention, the brake control apparatus, indicated at 1, is shown installed in the driver's compartment of an automobile, generally indicated at 2. The apparatus is applicable to various types of braking systems as a hand or parking brake control, operating either in conjunction with the service brakes or independently. For example, where the service brakes are hydraulically operated, the apparatus may be connected to a separate mechanical system provided for parking and for emergency use in case of failure of the hydraulic system.

In the present instance, the apparatus is shown interconnected with the service brakes of a mechanical braking system, with the same system operable either by the service brake pedal or by the hand brake, each independent of the other. The braking system, selected for illustrative purposes only, forms no part of the present invention and may represent any conventional system.

As shown, the service brake pedal 3 is carried on a rock shaft 4 suitably journalled at opposite ends of the side members of the chassis of the vehicle. The brake pedal is fixedly secured to the shaft, as by means of a pin 3', for imparting a partial revolution to the shaft when the pedal is depressed. A pair of cranks, 5, 5, is secured to the rock shaft at opposite ends thereof, each crank comprising a pair of oppositely disposed arms, the outer extremities of which make a pivotal connection with brake rods 6 for the front and rear brakes respectively. Cranks 5 may advantageously be secured to shaft 4 by means of pins 5'.

The cranks and brake rods may be in duplicate for opposite sides of the chassis, the front wheel brakes being connected respectively to the lower crank arms, and the rear wheel brakes to the upper arms. The brake drums and other brake operating parts associated with the wheels, forming no part of the present invention, are not illustrated.

When the service brake pedal is depressed, as shown in Figure 5, the rock shaft is rotated, causing a partial revolution of the respective crank arms, this movement being transmitted by the brake rods to the respective brakes in order to apply braking pressure. The brake pedal is held in normal brake-disengaging position by a tension spring 7, having its upper end anchored upon a hook 8 secured to the floor board, and its lower end engaged on a stud 9 forming a part of a yoke 10 secured to the rock shaft as hereinafter described.

An actuating lever 11 is loosely journalled on the rock shaft, preferably with its free or operating end disposed at a point beneath and between the seats for an operating connection with a pull rod 12 extended through the floor. The fulcrum point or pivotal end of the lever is straddled by the yoke 10 which is in the form of a pair of cranks, having their hubs pinned or otherwise secured to the shaft, and with their free ends joined by a cross pin 13 disposed immediately above the lever 11.

The yoke maintains the pivotal end of the lever in proper lateral position on the rock shaft, and permits normal operation of the service brakes without interference with the lever. When the brake pedal is depressed, rotating the rock shaft, as shown in Fig. 5, the yoke is free to swing upwardly away from the lever; and when the pedal is released, it returns to its normal position with the cross pin 13 serving as a stop for the pedal against the tension of the spring 7.

When the lever 11 is actuated, the yoke by its engagement with the lever is swung upwardly to rotate the rock shaft and transmit the movement to the brake rods and apply braking pressure to the wheels, as shown in Figure 3.

The pull rod or plunger 14 is connected to the free end of the lever by means of a clevis 15 secured by a pin 16 through an aperture in the lever. The pull rod preferably constitutes a semi-flexible cable, for instance, it may be a nine strand cable having a diameter of approximately one-eighth inch. The cable is secured at its lower end to the clevis through an aperture therein in any convenient manner, for example, by forming a knot or applying a collar on the end engaged through the aperture. To the upper end of the cable is secured a handle or knob 17 providing a convenient hand-hold adapted to be grasped by the operator in applying the brake. It is advantageous to secure a relatively heavy soft rubber disc 17' to the knob 17 in order to provide a seal against water and dust which might otherwise come up through opening 21.

The cable, preferably for its entire length, carries a series of balls 18 strung thereon in abutting contact, and individually slidable upon the cable somewhat in the manner of a strand of beads. The balls are preferably of rubber or other material having resilient qualities together with sufficient toughness. The balls 18 may be approximately three-eights of an inch in diameter, and of a material having a resiliency corresponding for example to a Durometer reading of from eighty-five to ninety-five.

The balls collectively provide a series of resilient abutments in conjunction with a catch in the form of a bracket 18a mounted at or near the floor of the vehicle. The bracket 18a may be secured to the floor by means of screws 19 and includes a flat top plate 20 having a keyhole slot 22 formed therein. The pull rod extends upwardly through an opening 21 of the slot, the opening being somewhat larger than the balls to permit free transverse thereof when the pull rod is actuated.

In applying the brakes, the pull rod is locked by swinging the same laterally rearwardly, the cable entering the slotted portion 22 causing separation of adjacent balls. The slot being of restricted width prevents passage of the balls, placing them under compression imposed by the pull on rod or cable 14, which tends to move downwardly with lever 11. The load is thus yieldingly imposed upon the balls disposed between the plate 20 and the knob. The pull rod may be locked in brake set position at any point along its length, the number of positions being determined by the number of balls or locking elements, thus facilitating the selection of a proper braking pressure. Although I believe the spherical shape illustrated is best suited in the present instance, the locking elements may take other forms; for example, they may be oval shaped or they may be in the form of a series of discs.

In applying the brakes, the load is carried by the cable, and after the brake is set by engagement of the balls against the catch plate, the load is transferred to the resilient balls which are then under compression between the plate and the handle. Each ball compresses slightly under the pressure, the cumulative effect of the series being sufficient to keep the cable taut under all conditions. The brake is released by pulling the pull rod upwardly in order to release the compression and then swinging it forwardly out of engagement with the top of the catch plate, permitting the balls to pass through the large aperture 21 of the keyhole slot.

In the modified structure, illustrated in Figure 9, slidable metal balls 18 are substituted for those of rubber, the balls cooperating with the keyhole slot in the same manner as above described. The pull rod in this instance may be provided with a compression spring 23 disposed between the clevis and the lowermost ball of the series to sustain them snugly in position on the cable. The spring permits separation of the balls for entry of the cable into the restricted notch when the brake is set. Being non-resilient, the balls do not provide a yielding engagement as do those of rubber, and may be utilized in particular instances where this is not desired. However, the spring may be transposed to the upper end of the pull rod beneath the hand grip to provide a resilient holding pressure should this be required. Spring means may of course be provided at both ends of the rod.

Although the control apparatus is shown and described in conjunction with a braking system, it is not necessarily limited to such usage, as there are various other control mechanisms to which it may be advantageously applied. Likewise, the apparatus is subject to other modifications and may be applied in various ways. For example, the lever may be pivoted in a vertical position forwardly of the dash board with the pull rod extending horizontally therethrough. The length of the lever also may be varied to the extent necessary to dispose the pull rod in the most advantageous position, or the end of the lever may be provided with a series of apertures for the purpose of ready adjustment.

Having thus described my invention, I claim:

1. A hand operated control mechanism for vehicle brakes, comprising a rock shaft having means associated therewith for actuating a braking system, a lever having one end in operative connection with the rock shaft, a hand operated pull rod connected with the opposite end of said lever for actuating the same, said pull rod including a series of spherical resilient latching elements thereon, and means cooperating with said latching elements operable to hold the pull rod in a selected position.

2. A hand operated control mechanism for vehicle brakes, comprising a rock shaft having means associated therewith for actuating a braking system, a lever having one end in operative connection with the rock shaft, a hand operated pull rod connected with the opposite end of said lever for actuating the same, said pull rod including a series of spherical, resilient latching elements slidably engaged thereon, and a slotted element associated with the pull rod for engagement between said spherical elements operable to hold the pull rod in a selected position upon engagement with the slotted element.

3. In a control apparatus, a manually operated control rod, comprising a cable having a series of resilient balls slidably strung thereon in abutting contact with each other, a catch cooperating with said balls operable to hold the control rod in any one of a series of selected positions, the catch including an aperture for receiving the control rod, the aperture of sufficient size to permit passage of the balls for translating the control rod and the aperture including a notched portion for receiving and embracing the cable to prevent passage of the balls and hold the control rod in a selected position when engaged therein.

4. A manually operated control apparatus comprising a pull rod, a series of latching elements attached thereto in longitudinally slidable relationship therewith, a support for said rod having an aperture therein permitting the passage of said latching elements and also having a notched portion receiving said rod but preventing the passage of said latching elements whereby when said rod is moved toward said notch a reactive pull on said rod places said latching elements under compression.

PAUL KLOTSCH.